United States Patent
Watanabe et al.

(10) Patent No.: US 9,896,149 B2
(45) Date of Patent: Feb. 20, 2018

(54) HANDLEBAR-MOUNTED SWITCH DEVICE FOR A SADDLE-TYPE VEHICLE, AND VEHICLE INCLUDING SAME

(71) Applicant: HONDA MOTOR CO., LTD., Minato-Ku, Tokyo (JP)

(72) Inventors: Masaru Watanabe, Wako (JP); Manabu Ichikawa, Wako (JP); Kazuhiko Ono, Wako (JP); Hirotaka Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 70 days.

(21) Appl. No.: 14/831,274

(22) Filed: Aug. 20, 2015

(65) Prior Publication Data

US 2016/0059924 A1 Mar. 3, 2016

(30) Foreign Application Priority Data

Aug. 29, 2014 (JP) .................................. 2014-176130

(51) Int. Cl.
| | |
|---|---|
| H01H 9/04 | (2006.01) |
| B62K 23/02 | (2006.01) |
| B62K 11/14 | (2006.01) |
| H01H 3/02 | (2006.01) |
| H01H 9/06 | (2006.01) |

(52) U.S. Cl.
CPC ............. B62K 23/02 (2013.01); B62K 11/14 (2013.01); H01H 3/02 (2013.01); H01H 2009/068 (2013.01); H01H 2231/026 (2013.01)

(58) Field of Classification Search
CPC ............. H01H 3/02; H01H 2231/026; H01H 2009/068; B62K 11/14; B62K 23/02

USPC .......... 200/61.54, 61.85, 61.87, 61.88, 293.1
See application file for complete search history.

(56) References Cited

U.S. PATENT DOCUMENTS

| 4,847,454 | A | * | 7/1989 | Hiruma | ................ | B60Q 1/1469 |
|---|---|---|---|---|---|---|
| | | | | | | 200/293.1 |
| 8,357,864 | B2 | * | 1/2013 | Murasawa | ............. | B60K 20/06 |
| | | | | | | 200/61.88 |
| 2013/0140154 | A1 | | 6/2013 | Tozuka et al. | | |

FOREIGN PATENT DOCUMENTS

JP 2013-118080 A 6/2003

* cited by examiner

*Primary Examiner* — Edwin A. Leon
*Assistant Examiner* — Lheiren Mae A Caroc
(74) *Attorney, Agent, or Firm* — Carrier Blackman & Associates, P.C.; Joseph P. Carrier; Jingli Wang

(57) ABSTRACT

A handlebar-mounted switch control device includes switch activation buttons which respectively correspond to specific switches, and which are arranged on surfaces of a switch case adjacent to a grip in an end portion of a handlebar. Two switch activation buttons are disposed on a front outer surface of the switch case. The two switch activation buttons are configured and placed in such a way so that a rider can easily recognize which of the two switch activation buttons the rider touches. The second switch activation button is placed above the first switch activation button, and inward of the first switch activation button in a vehicle width direction. A guide surface inclining to extend inward in the vehicle width direction toward an upper side is formed on a side surface of the switch case which is above the first switch activation button, and which faces the grip.

12 Claims, 5 Drawing Sheets

HANDLEBAR-MOUNTED SWITCH DEVICE FOR A SADDLE-TYPE VEHICLE, AND VEHICLE INCLUDING SAME

CROSS-REFERENCE TO RELATED APPLICATIONS

The present invention claims priority under 35 USC 119 based on Japanese patent application No. 2014-176130, filed on Aug. 29, 2014. The entire subject matter of this priority document, including specification claims and drawings, is incorporated by reference herein.

BACKGROUND OF THE INVENTION

Technical Field of the Invention

The present invention relates to a handlebar-mounted switch device including switch activation buttons which respectively correspond to multiple switches, and which are arranged on surfaces of a switch case mounted on a steering handlebar provided to a saddle-type vehicle in a way that the switch case is adjacent to a grip in an end portion of the handlebar.

Background Art

Patent Document 1 has made known a switch device whose switch case is mounted on a handlebar provided to a motorcycle in a way that the switch case is adjacent to a grip of the handlebar with multiple switch activation buttons arranged exposed from surfaces of a switch case.

[Patent Document 1] Japanese Patent Application Publication No. 2013-118080

Problems to be Solved by the Invention

In the handlebar-mounted switch device disclosed in Patent Document 1, two switch activation buttons are disposed on a front surface which is one of the outer surfaces of the switch case, and which faces the front in a vehicle front-rear direction. However, it is difficult for the rider seated on the rider seat to recognize the two switch activation buttons visually. For this reason, it is desirable that the two switch activation buttons be designed such that the rider can clearly recognize which of the two switch activation buttons the rider touches.

Although the known handlebar-mounted switches are usable for their intended purposes, a need still exists in the art for an improved handlebar-mounted switch. In particular, there is a need for an improved handlebar-mounted switch which will overcome the problems with the known art.

SUMMARY OF THE INVENTION

The present invention has been made with the foregoing situation taken into consideration. An object of the present invention is to provide a handlebar-mounted switch device which enables the rider to easily recognize which of two switch activation buttons the rider touches, the two switch activation buttons disposed on a front surface which is one of outer surfaces of a switch case, and which faces the front in a vehicle front-rear direction.

Means for Solving the Problems

For the purpose of achieving the above-mentioned object, a first feature of the present invention is a handlebar-mounted switch device as follows. The handlebar-mounted switch device includes switch activation buttons which respectively correspond to multiple switches, and which are arranged on surfaces of a switch case mounted on a steering handlebar provided to a saddle-type vehicle in a way that the switch case is adjacent to a grip in an end portion of the handlebar. Of the multiple switch activation buttons, first and second switch activation buttons are disposed on a front surface which is one of outer surfaces of the switch case, and which face the front in a vehicle front-rear direction. The second switch activation button is placed above the first switch activation button, and inward of the first switch activation button in a vehicle width direction. A guide surface inclining to extend inward in the vehicle width direction toward an upper side is formed on a side surface of the switch case which is above the first switch activation button, and which faces the grip.

Furthermore, the present invention has the following second feature in addition to the configuration of the first feature. A protrusion projecting from the guide surface is formed on the switch case at a position corresponding to the middle between the first and second switch activation buttons in an up-down direction.

The present invention has the following third feature in addition to the configuration of the first or second feature. A tip end portion of a first manipulation surface included in the first switch activation button is set to extend in a direction at a first angle to a vertical plane, inclusive of an axis of the handlebar, in a part where the switch case 32 is provided on the handlebar 30. A tip end portion of a second manipulation surface included in the second switch activation button is set to extend in a direction at a second angle, larger than the first angle, to the vertical plane.

The present invention has the following fourth feature in addition to the configuration of the third feature. A part of the first manipulation surface is placed projecting outward of the switch case in the vehicle width direction.

Moreover, the present invention has the following fifth feature in addition to the configuration of the third or fourth feature. The first switch is a shift switch for performing a shift operation while the vehicle is running. The second switch is a running conditions selector switch for setting a running condition by being manipulated while the vehicle stops.

Effects of the Invention

According to the first feature of the present invention, of the first and second switch activation buttons disposed on the front surface which is one of the outer surfaces of the switch case and which faces the front in the vehicle front-rear direction, the second switch activation button is placed above the first switch activation button, and inward of the first switch activation button in the vehicle width direction. For this reason, the first and second switch activation buttons can be offset from each other in the up-down direction and in the vehicle width direction. Accordingly, the rider can easily recognize which of the first and second switch activation buttons the rider touches. In addition, the guide surface inclining to extend inward in the vehicle width direction toward the upper side is formed on the side surface of the switch case which is above the first switch activation button, and which faces the grip. For this reason, the guide surface guides a finger of the rider to the second switch activation button which is placed at a position farther from the grip than the first switch activation button is, and the guide surface reduces the size of the switch case so that the distance from the grip to the second switch activation button is shortened. Thereby, it is possible to enhance the manipulability of the second switch activation button.

According to the second feature of the present invention, the protrusion projects from the guide surface at the position corresponding to the middle between the first and second switch activation buttons in the up-down direction. For this reason, by touching the protrusion, the rider can recognize a boundary portion between the first and second switch activation buttons in the up-down direction.

According to the third feature of the present invention, the tip end portion of the first manipulation surface included in the first switch activation button, and the tip end portion of the second manipulation surface included in the second switch activation button are placed in the way that the tip end portions extend in their respective directions at the different angles to the vertical plane inclusive of the axis of the handlebar. For this reasons, the rider can recognize which of the first and second switch activation buttons the rider touches on the basis of an angle which the rider feels when the rider touches the manipulation surfaces. In addition, the first angle of the tip end portion of the first manipulation surface to the vertical plane is smaller than the second angle of the tip end portion of the second manipulation surface to the vertical plane. For this reason, the first switch activation button is easier to manipulate than the second switch activation button is. The difference in manipulability between the two switch activation buttons makes it possible for the rider to recognize more clearly which of the operators the rider is going to manipulate.

According to the fourth feature of the present invention, the part of the first manipulation surface projects outward of the switch case in the vehicle width direction. For this reason, it is possible to enhance the manipulability of the first switch activation button by placing the first switch activation button closer to the grip.

According to the fifth feature of the present invention, the first switch is a shift switch for performing a shift operation while the vehicle is running, and the second switch is a running conditions selector switch for setting a running condition by being manipulated while the vehicle stops. For this reason, the frequency of manipulation of the first switch activation button can be made different from the frequency of manipulation of the second switch activation button. Thereby, the second switch activation button which is used less frequently than the first switch activation button can be placed in a position which makes the second switch activation button more difficult to manipulate, and can be formed in a shape which makes the second switch activation button more difficult to manipulate.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
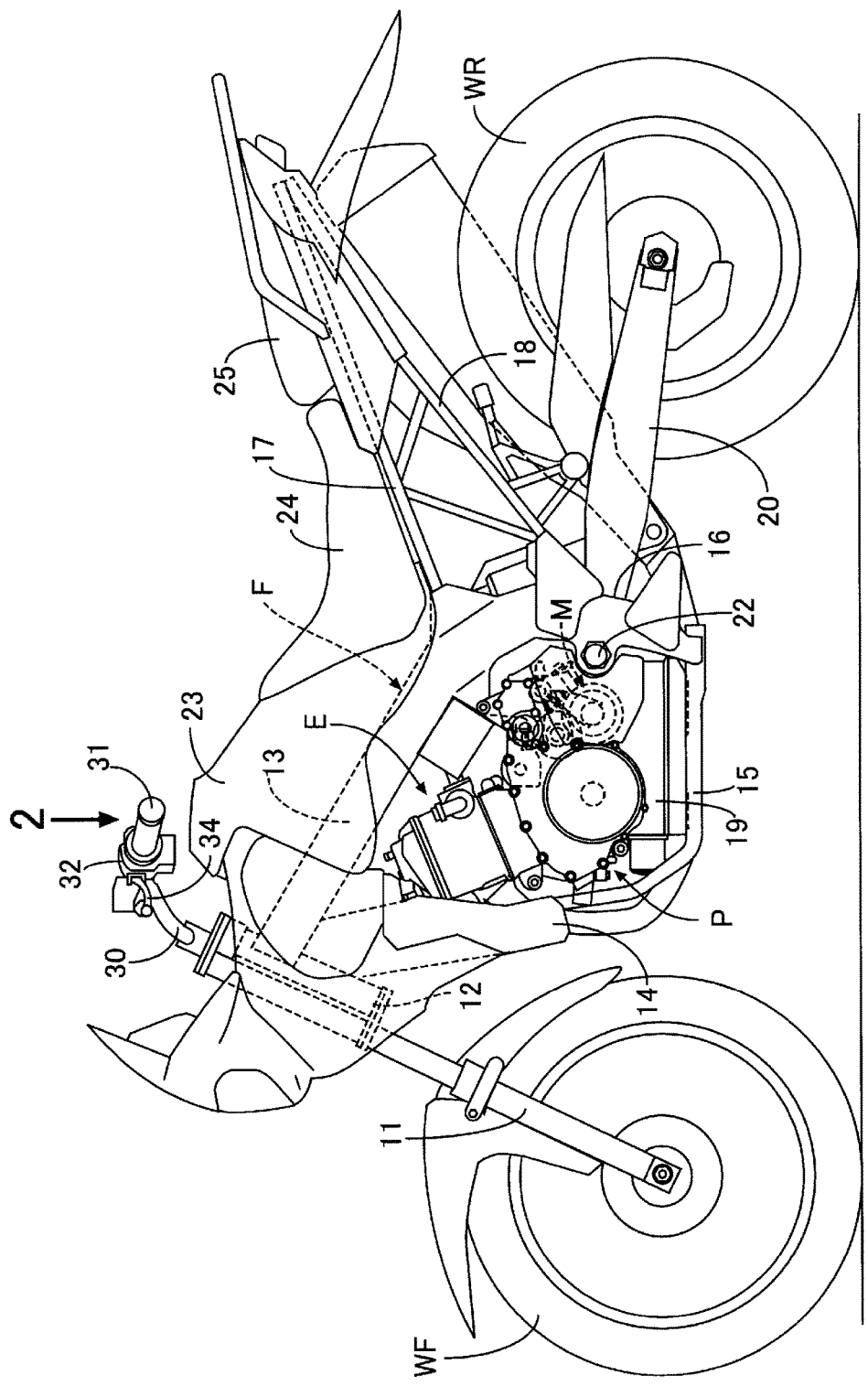
FIG. 1 is a left-side view of a motorcycle.

Referring now to FIG. 1, a vehicle body frame F of a motorcycle, which is a saddle-type vehicle, includes: a head pipe 12 which pivotally and steerably supports a front fork 11 which, in turn, rotatably supports a front wheel WF thereon. The vehicle body frame F also includes a pair of left and right main frames 13 extending rearwardly downward from the head pipe 12; a pair of left and right down frames 14 extending rearwardly downward from the head pipe 12 more steeply than the main frames 13; and a pair of lower frames 15 extending rearward from the lower ends of the two down frames 14.

The vehicle body frame F further includes a pair of left and right center frames 16 extending downward from the rear ends of the main frames 13, and continuously provided to the rear ends of the two lower frames 15; a pair of left and right seat rails 17 extending rearward upward from the rear ends of the main frames 13; and a pair of left and right rear sub-frames 18 connecting the lower portions of the center frames 16 to the rear portions of the seat rails 17.

A two-cylinder internal combustion engine E, and a power unit P including a transmission M are disposed in an area surrounded by the main frames 13, the down frames 14, the lower frames 15 and the center frames 16, in a way that the internal combustion engine E and the power unit P are supported by the vehicle body frame F. The transmission M is housed in a crankcase 19 of the internal combustion engine E.

In addition, the front end portions of swing arms 20 whose rear end portions pivotally support a rear wheel WR driven by power exerted from the power unit P are pivotally supported by a spindle 22 in the lower portions of the center frames 16 in a way that the swing arms 20 are vertically swingable around the spindle 22. Furthermore, the rear portion of the crankcase 19 is supported by the spindle 22 as well. Furthermore, above the internal combustion engine E, a fuel tank 23 is mounted on the main frames 13. A rider seat 24 disposed in the rear of the fuel tank 23, and a pillion seat 25 disposed in the rear of the rider seat 24 are supported by the seat rails 17.

Referring now to FIGS. 2 through 5, a grip 31 is provided to the left end portion of a handlebar 30 steerably supported by the head pipe 12. The handlebar 30 is affixed to the front fork 11 to control movement thereof. A switch case 32 is provided attached to the handlebar 30 in a way that the switch case 32 is adjacent to the grip 31.

In addition, a clutch lever 34 disposed in front of the switch case 32 and the grip 31 is pivotally supported by a bracket 33 which is fixed to the handlebar 30 in a way that the bracket 33 is inward of the switch case 32 in a vehicle width direction.

The switch case 32 is provided with multiple switches. In this embodiment, the switch case 32 is provided with a turn signal switch 36, a dimmer switch 37, a horn switch 38, a mode selector switch 39, a mode setting switch 40, a downshift switch 41 for performing a downshift operation, an up-shift switch 42 for performing an up-shift operation, and a running conditions selector switch 43.

A turn signal switch activation button 36a, a dimmer switch activation button 37a, a horn switch activation button 38a, a mode selector switch activation button 39a, a mode setting switch activation button 40a, a downshift switch activation button 41a, an up-shift switch activation button 42a, and a running conditions selector switch activation button 43a, respectively corresponding to the switches 36 to 43, are arranged exposed from surfaces of the switch case 32.

The mode selector switch 39 is a switch for selecting either an automatic transmission mode or a manual transmission mode, and while the automatic transmission mode is selected, selecting either a drive mode covering a range of a cruising drive to a sport drive or a sport mode suitable for the sport drive with an engine speed of the internal combustion engine E set at a higher-performance level.

The mode setting switch 40 is set by manipulating the mode setting switch activation button 40a which is displayed on a display screen in a way that the mode setting switch activation button 40a is changed by manipulating the mode selector switch activation button 39a.

The downshift switch 41 is a switch for performing the downshift operation when the manual transmission mode has been selected. The up-shift switch 42 is a switch for performing the up-shift operation when the manual transmission mode has been selected.

Furthermore, the running conditions selector switch 43 is a switch for setting a vehicle running condition by being manipulated while the vehicle stops. For example, the running conditions selector switch 43 is a switch designed such that when the rider judges that the vehicle is running on a slippery road surface which makes the rear wheel WR skid, the rider cuts the ignition of the internal combustion engine E by manipulating the switch with the vehicle stopped, and thereby solves the skidding of the rear wheel WR through torque control.

Of the multiple operators 36a to 43a, the up-shift switch activation button (or operator) 42a as a first switch activation button (or operator) and the running conditions selector switch activation button (or operator) 43a as a second switch activation button (or operator) are disposed on a front surface 32a, which is one of the outer surfaces of the switch case 32, and which faces forwardly thereon. Throughout the present specification and the claims, the up-shift switch activation button 42a and the running conditions selector switch activation button 43a are also referred to as switch activation operators.

The up-shift switch activation button 42a and the running conditions selector switch activation button 43a are disposed on the front surface 32a of the switch case 32 in such a way that the running conditions selector switch activation button 43a is placed above the up-shift switch activation button 42a, and inward of the up-shift switch activation button 42a in the vehicle width direction.

In addition, a guide surface 44, inclining to extend upward as it moves inwardly in the vehicle width direction, is formed on a side surface 32b of the switch case 32 above the up-shift switch activation button 42a, and which faces the grip 31. In this embodiment, the guide surface 44 is a flat surface. However, the guide surface 44 may be formed as a curved surface which is set back corresponding to a finger of the rider.

The guide surface 44 is formed on the side surface 32b of the switch case 32 in a way that a lower end portion of the guide surface 44 is disposed at a position corresponding to a middle area disposed between the up-shift switch activation button 42a and the running conditions selector switch activation button 43a in an up-down direction. A first protrusion 45 is formed on the switch case 32, projecting from the lower end portion of the guide surface 44 at a position corresponding to the middle area between the up-shift switch activation button 42a and the running conditions selector switch activation button 43a.

Furthermore, a second protrusion 46 for defining an upper end of the guide surface 44 is formed on the switch case 32 projecting from the upper end of the guide surface 44.

Figure 2:
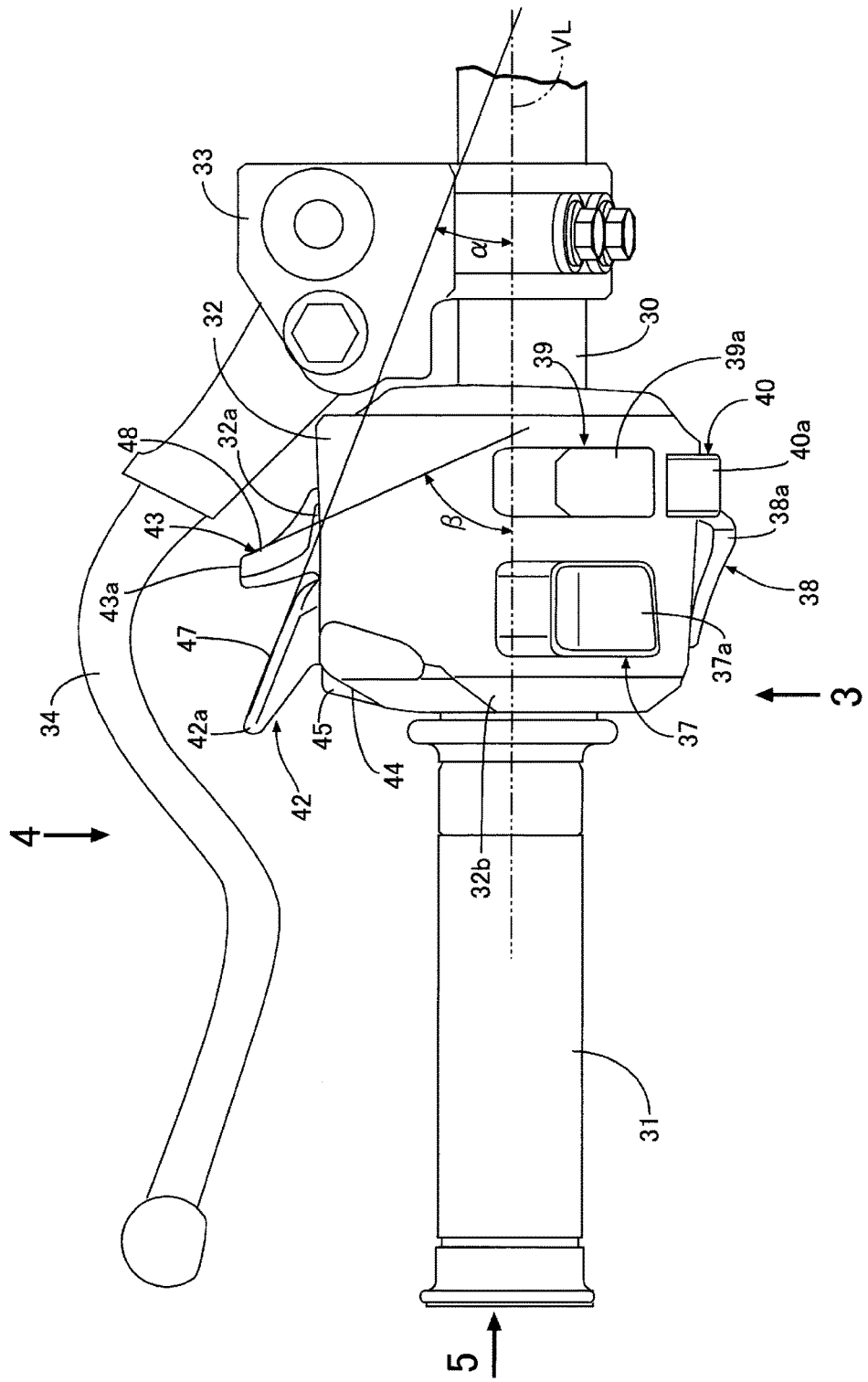
FIG. 2 is a top plan view of a part indicated with an arrow 2 of FIG. 1.
Figure 3:
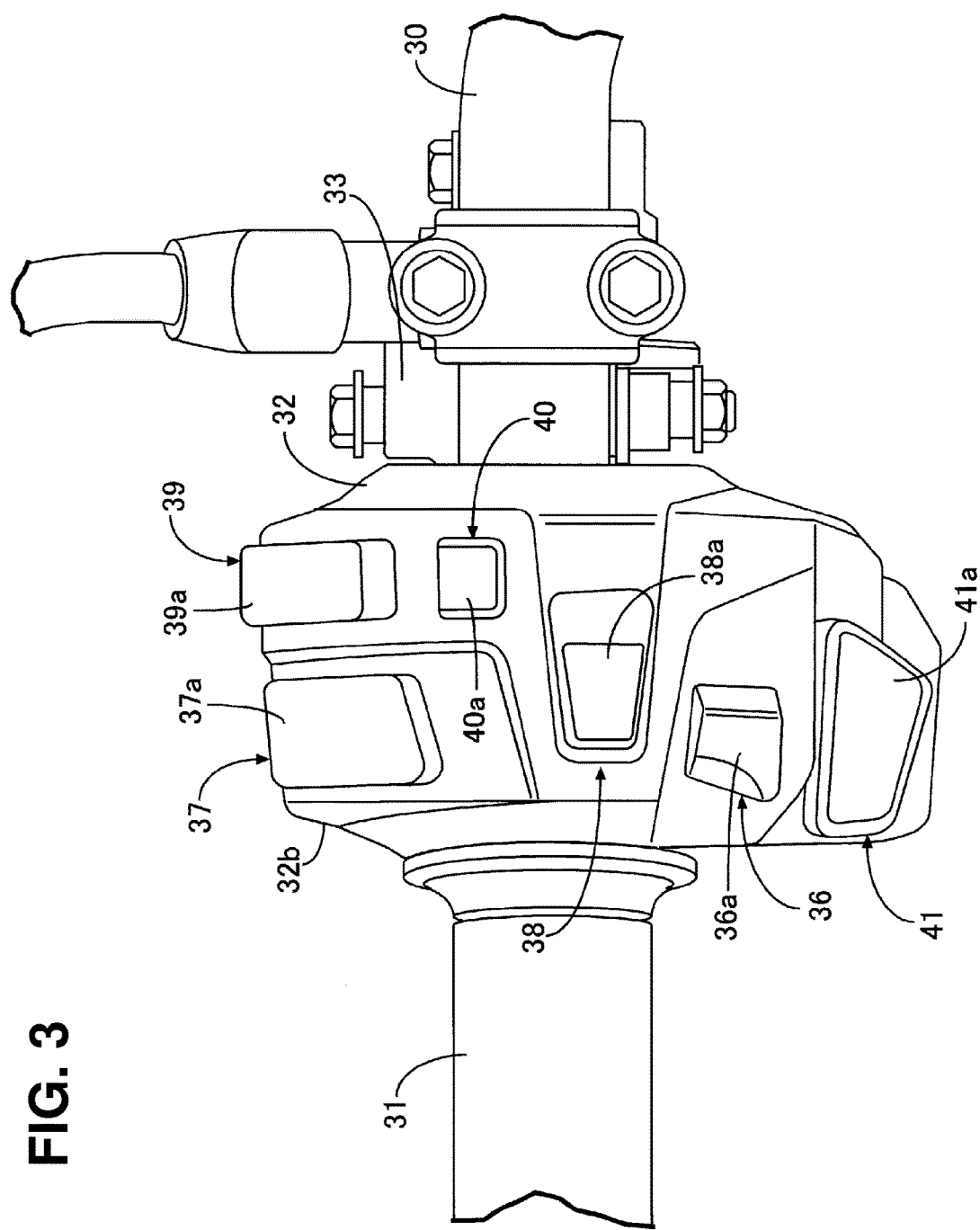
FIG. 3 is a rear plan view of a part indicated with an arrow 3 of FIG. 2.
Figure 4:
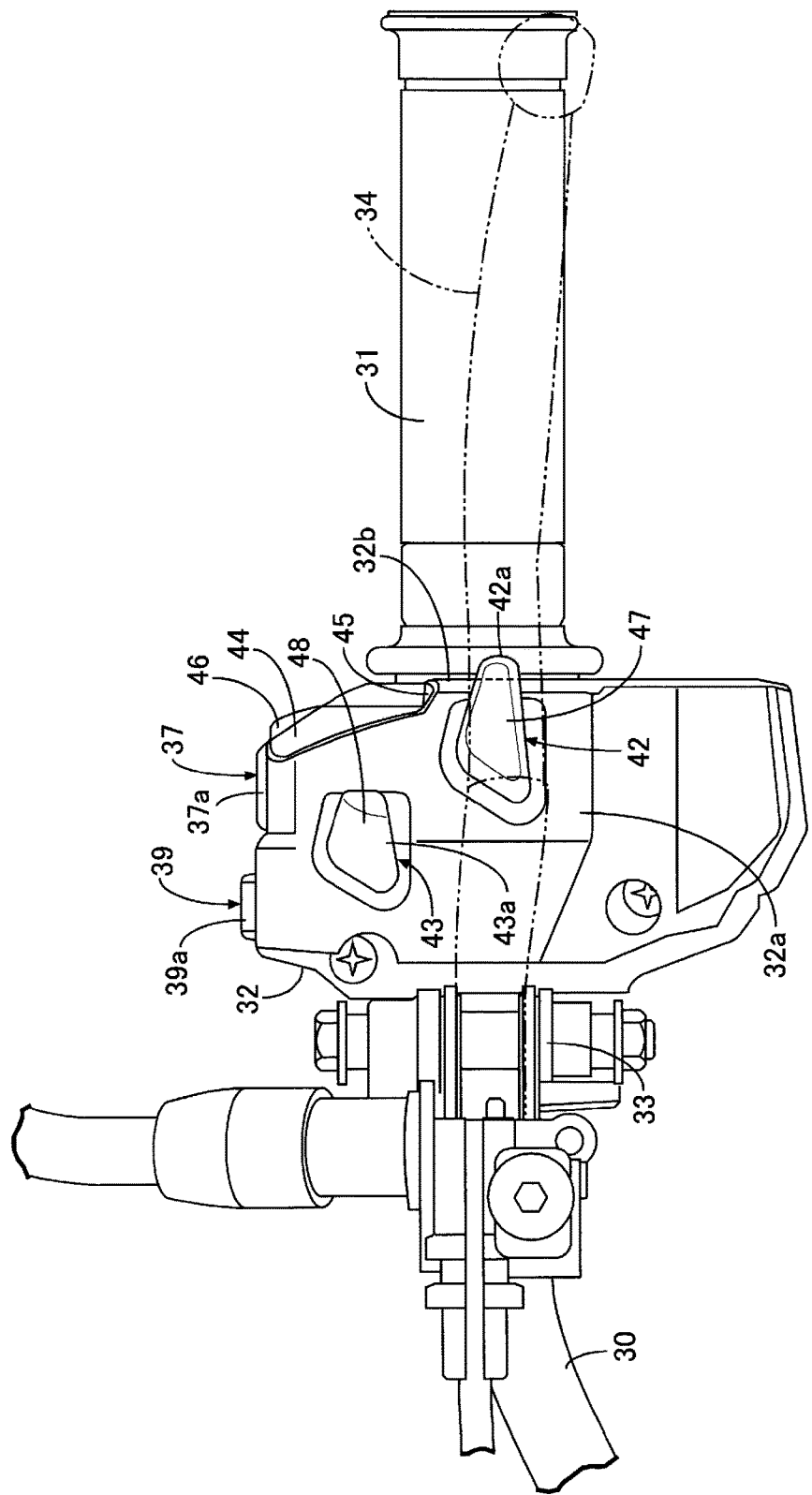
FIG. 4 is a front plan view of a part indicated with an arrow 4 of FIG. 2 with a clutch lever omitted from the view.
Figure 5:
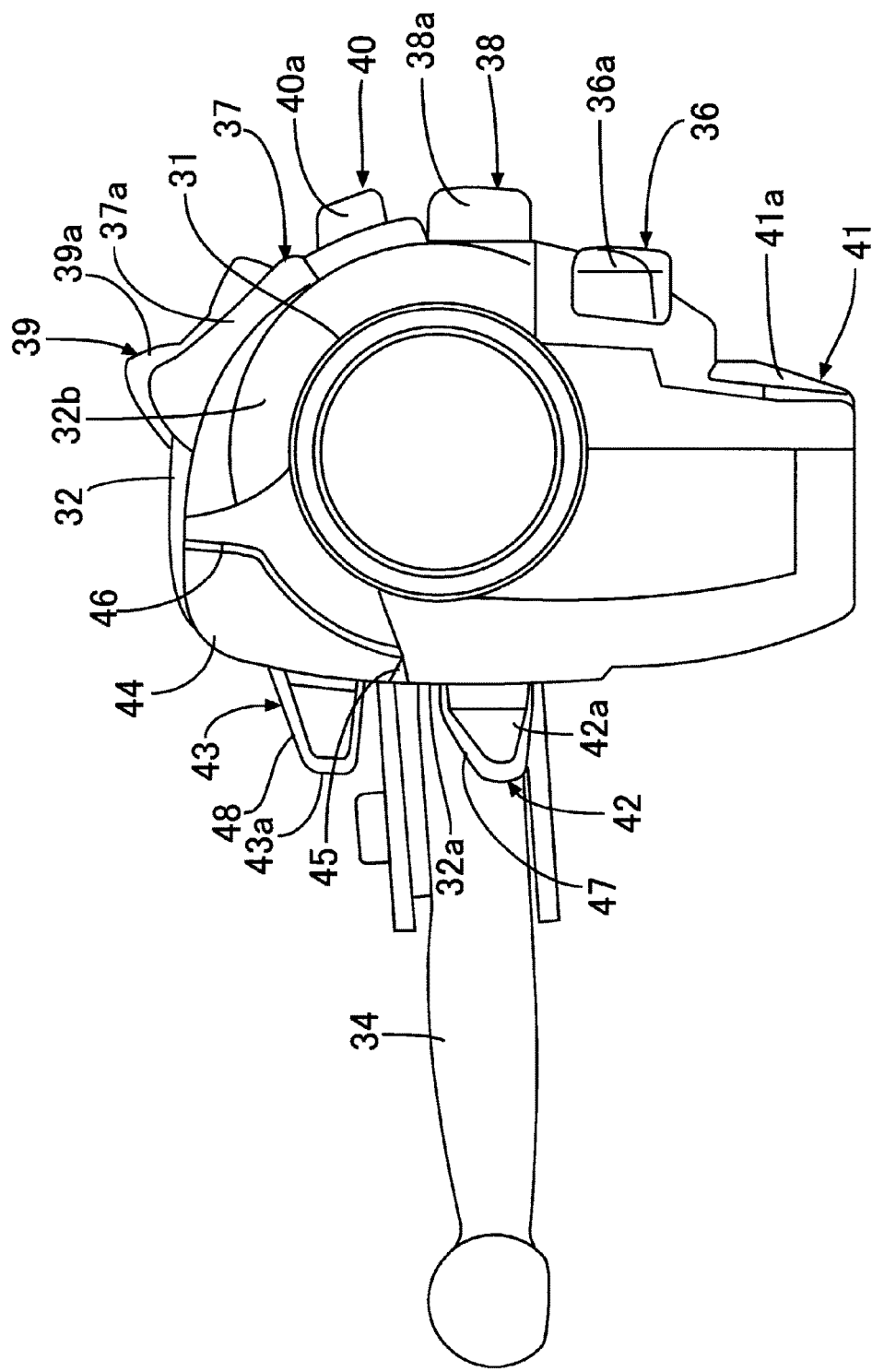
FIG. 5 is a left side plan view of a part indicated with an arrow 5 of FIG. 2.

Moreover, as seen best in FIG. 2, a first manipulation surface 47 of the up-shift switch activation button 42a is configured in such a way that the entirety of the first manipulation surface 47, inclusive of its tip end portion, extends in a direction at a first angle $\alpha$ (for example, an angle of 40 degrees or less) in relation to a vertical plane VL, inclusive of an axis of the handlebar 30, in a part where the switch case 32 is provided on the handlebar 30.

A tip end portion of a second manipulation surface 48 included in the running conditions selector switch activation button 43a is set to extend in a direction at a second angle $\beta$ (for example, an angle of 50 degrees or greater), in relation to the vertical plane VL, where the second angle $\beta$ is larger than the first angle $\alpha$.

In addition, the up-shift switch activation button 42a is disposed on the front surface 32a of the switch case 32 is configured and arranged so that a part of the first manipulation surface 47 of the up-shift switch activation button 42a projects outward of the switch case 32 in the vehicle width direction, namely toward the grip 31.

Next, descriptions will be provided for how the depicted embodiment works. The up-shift switch activation button 42a and the running conditions selector switch activation button 43a are disposed on the front surface 32a of the switch case 32, which faces forwardly thereon in the vehicle front-rear direction. The running conditions selector switch activation button 43a is placed above the up-shift switch activation button 42a, and inward of the up-shift switch activation button 42a in the vehicle width direction. For these reasons, the up-shift switch activation button 42a and the running conditions selector switch activation button 43a are offset from each other in the up-down direction and in the vehicle width direction. Accordingly, the rider can easily recognize and identify the up-shift switch activation button 42a and the running conditions selector switch activation button 43a at any given time, and can easily distinguish between them by their respective shape and location.

In addition, the guide surface 44 inclining to extend inward in the vehicle width direction toward the upper side is formed on the side surface 32b of the switch case 32 which is above the up-shift switch activation button 42a, and which faces the grip 31. For this reason, the guide surface 44 guides a finger of the rider to the running conditions selector switch activation button 43a which is placed at a position farther from the grip 31 than the up-shift switch activation button 42a, and the guide surface 44 reduces the size of the switch case 32 so that the distance from the grip 31 to the running conditions selector switch activation button 43a is shortened. Thereby, it is possible to enhance the manipulability of the running conditions selector switch activation button 43a.

Furthermore, the first protrusion 45 projecting from the guide surface 44 is formed on the switch case 32 at the position corresponding to the middle between the up-shift switch activation button 42a and the running conditions selector switch activation button 43a in the up-down direction. For this reason, by touching the first protrusion 45, the rider can recognize the boundary portion between the up-shift switch activation button 42a and the running conditions selector switch activation button 43a in the up-down direction.

In addition, the tip end portion of the first manipulation surface 47 included in the up-shift switch activation button 42a is set to extend in the direction at the first angle α to a vertical plane VL, inclusive of the axis of the handlebar 30, in a part where the switch case 32 is provided on the handlebar 30, while the tip end portion of the second manipulation surface 48 included in the running conditions selector switch activation button 43a is set to extend in the direction at the second angle β, larger than the first angle α, to the vertical plane VL. For this reason, the rider can recognize which of the up-shift switch activation button 42a and the running conditions selector switch activation button 43a the rider touches, on the basis of an angle which the rider feels when the rider touches the first and second manipulation surfaces 47, 48.

Further, the first angle α of the tip end portion of the first manipulation surface 47 to the vertical plane VL is smaller than the second angle β of the tip end portion of the second manipulation surface 48 to the vertical plane VL. For this reason, the up-shift switch activation button 42a is easier to manipulate than the running conditions selector switch activation button 43a is. The difference in manipulability between the two switch activation buttons 42a, 43a makes it possible for the rider to recognize more clearly which of the operators 42a, 43a the rider is going to manipulate.

In addition, the part of the first manipulation surface 47 included in the up-shift switch activation button 42a is placed projecting outward of the switch case 32 in the vehicle width direction. For this reason, it is possible to enhance the manipulability of the up-shift switch activation button 42a by placing the up-shift switch activation button 42a closer to the grip 31.

Furthermore, the up-shift switch 42 is the shift switch for performing the shift operation while the vehicle is running, and the running conditions selector switch 43 is the switch for setting a running condition by being manipulated while the vehicle stops. For this reason, the frequency of manipulation of the up-shift switch activation button 42a is different from the frequency of manipulation of the running conditions selector switch activation button 43a. Thereby, the running conditions selector switch activation button 43a which is used less frequently than the up-shift switch activation button 42a can be placed in the position which makes the running conditions selector switch activation button 43a more difficult to manipulate, and can be formed in a shape which makes the running conditions selector switch activation button 43a more difficult to manipulate.

It should be noted that depending on the shape of the handlebar and the shapes of the switches, the first switch activation button may be placed in an upper portion of the front surface of the switch case, and the second switch activation button may be placed in an inner part of a lower portion of the front surface of the switch case in the vehicle width direction for the purpose of placing the second switch activation button at a position which makes the second switch activation button difficult to manipulate.

Although the foregoing descriptions have been provided for the embodiment of the present invention, the present invention is not limited to the embodiment. Various design changes may be made to the present invention without departing from the present invention described in the scope of claims.

For example, the present invention is applicable to a saddle-type vehicle which is provided with no clutch lever because the manual transmission mode is designed such that the clutch lever 34 need not be manipulated.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

EXPLANATION OF THE REFERENCE NUMERALS

30 handlebar
31 grip
32 switch case
32a front surface
32b side surface
36 turn signal switch
36a turn signal switch activation button
37 dimmer switch
37a dimmer switch activation button
38 horn switch
38a horn switch activation button
39 mode selector switch
39a mode selector switch activation button
40 mode setting switch
40a mode setting switch activation button
41 downshift switch
41a downshift switch activation button
42 up-shift switch
42a up-shift switch activation button (first switch activation button)
43 running conditions selector switch
43a running conditions selector switch activation button (second switch activation button)
44 guide surface
45 protrusion
47 first manipulation surface
48 second manipulation surface
α first angle
β second angle
VL vertical plane

What is claimed is:

1. A handlebar-mounted switch device in which a plurality of switch activation operators, respectively corresponding to a plurality of switches, are arranged on surfaces of a switch case mounted on a steering handlebar of a saddle-type vehicle, said switch case being disposed adjacent to a grip disposed at an end portion of the handlebar, said switch device comprising:

first and second switch activation operators for respectively activating first and second switches are disposed on a front surface of the switch case, which faces forwardly in a vehicle front-rear direction, the second switch activation operator is placed above the first switch activation operator, and inward of the first switch activation operator in a vehicle width direction; and a guide surface formed on a side surface of the switch case above the first switch activation operator and facing the grip, said guide surface inclining to extend upwardly as it moves inward in the vehicle width direction, wherein the guide surface is disposed closer to the grip than is the second switch activation operator, a first manipulation surface of the first switch activation operator extends in a direction at a first angle to a vertical plane, inclusive of an axis of the handlebar, in a part where the switch case is provided on the handlebar, and a second manipulation surface of the second switch activation operator extends in a direction at a second angle to the vertical plane, where the second angle is larger than the first angle.

2. The handlebar-mounted switch device according to claim 1, wherein a protrusion projecting from the guide surface is formed on the switch case at a position corresponding to a middle area disposed between the first and second switch activation operators in an up-down direction.

3. The handlebar-mounted switch device according to claim 1, wherein a part of the first manipulation surface projects outwardly beyond the switch case in the vehicle width direction.

4. The handlebar-mounted switch device according to claim 1, wherein:
the first switch is a shift switch for performing a shift operation while the vehicle is running, and
the second switch is a running conditions selector switch for selecting a running condition when the vehicle is stopped.

5. The handlebar-mounted switch device according to claim 1, wherein the guide surface faces forward of the vehicle and also faces outward of the vehicle.

6. The handlebar-mounted switch device according to claim 1, wherein the guide surface is spaced apart from the second switch activation operator.

7. A saddle-type vehicle, comprising:
a steering handlebar; and
a handlebar-mounted switch device in which plurality of switch activation operators, respectively corresponding to a plurality of switches, are arranged on surfaces of a switch case mounted on the steering handlebar, said switch case disposed being adjacent to a grip disposed at an end portion of the steering handlebar,
wherein:

first and second switch activation operators for respectively activating first and second switches are disposed on a front surface of the switch case, which faces forwardly in a vehicle front-rear direction, the second switch activation operator is placed above the first switch activation operator, and inward of the first switch activation operator in a vehicle width direction, and a guide surface is formed on a side surface of the switch case above the first switch activation operator and facing the grip, said guide surface inclining to extend upwardly as it moves inward in the vehicle width direction, the guide surface is disposed closer to the grip than is the second switch activation operator, a first manipulation surface of the first switch activation operator extends in a direction at a first angle to a vertical plane, inclusive of an axis of the handlebar, in a part where the switch case is provided on the handlebar, and a second manipulation surface of the second switch activation operator extends in a direction at a second angle to the vertical plane, where the second angle is larger than the first angle.

8. The saddle-type vehicle according to claim 7, wherein a protrusion projecting from the guide surface is formed on the switch case at a position corresponding to a middle area disposed between the first and second switch activation operators in an up-down direction.

9. The saddle-type vehicle according to claim 7, wherein a part of the first manipulation surface projects outwardly beyond the switch case in the vehicle width direction.

10. The saddle-type vehicle according to claim 7, wherein:
the first switch is a shift switch for performing a shift operation while the vehicle is running, and
the second switch is a running conditions selector switch for selecting a running condition when the vehicle is stopped.

11. The saddle-type vehicle according to claim 7, wherein the guide surface faces forward of the vehicle and also faces outward of the vehicle.

12. The saddle-type vehicle according to claim 7, wherein the guide surface is spaced apart from the second switch activation operator.

* * * * *